INVENTOR
DAVID W. HAMLIN
BY
ATTORNEY

Aug. 1, 1950 D. W. HAMLIN 2,517,106
CUTTING TOOL FOR EMPTYING SHELLS
Filed Dec. 28, 1945 2 Sheets-Sheet 2
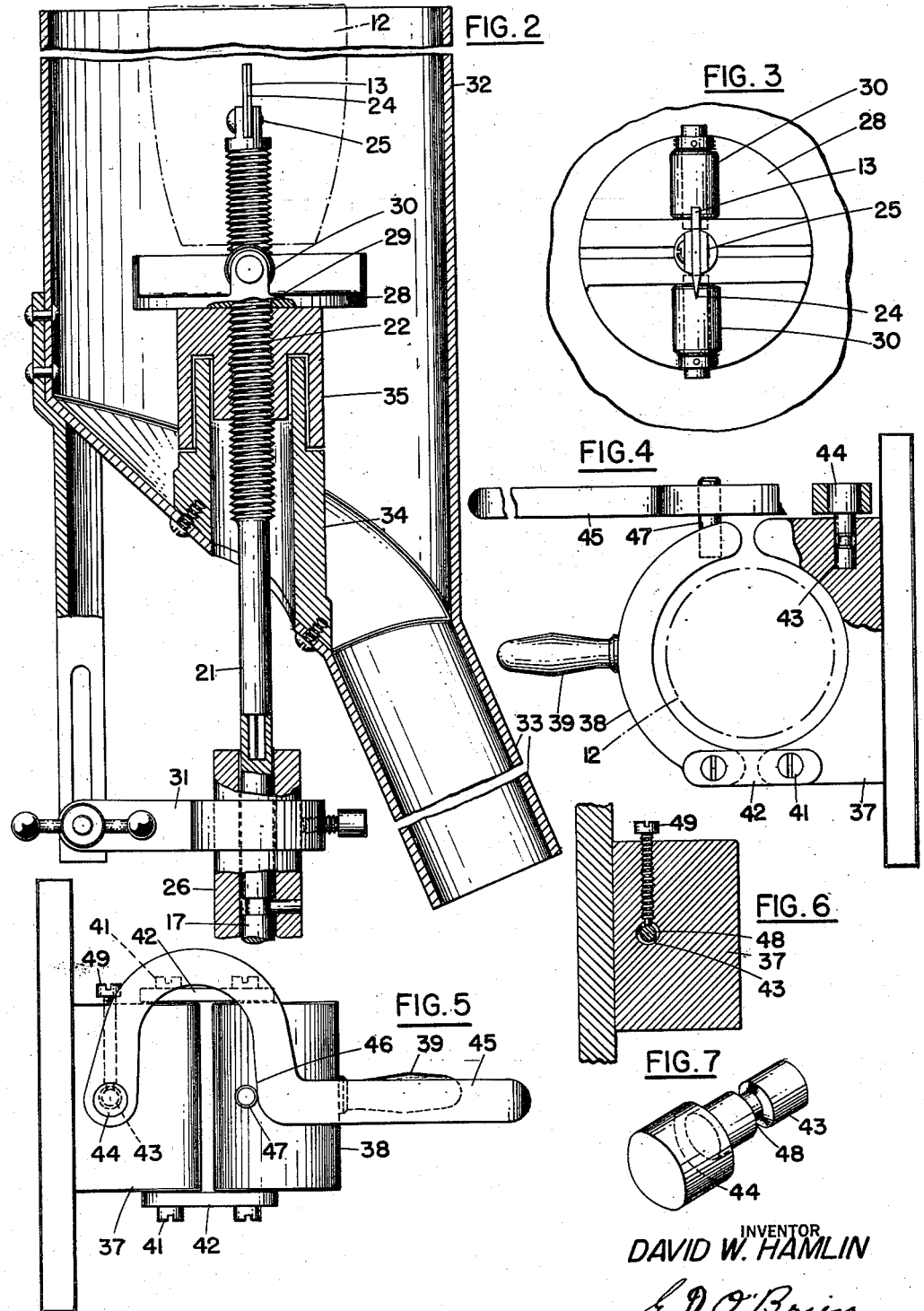
INVENTOR
DAVID W. HAMLIN
BY
*G. D. O'Brien*
ATTORNEY Patented Aug. 1, 1950

2,517,106

UNITED STATES PATENT OFFICE 2,517,106

CUTTING TOOL FOR EMPTYING SHELLS

David W. Hamlin, Silver Spring, Md., assignor to the United States of America as represented by the Secretary of the Navy Application December 28, 1945, Serial No. 637,748

1 Claim. (Cl. 86—1.5)

This invention relates to gun ammunition and more particularly to a device for removing the charge from a projectile.

Under some circumstances, as in testing, it becomes necessary or desirable to remove the explosive charge of a projectile from the nose end. The principal object of this invention is the provision of a tool that performs this operation safely, expeditiously, and thoroughly.

The invention will be more clearly understood with reference to the accompanying drawings, forming part of this specification, in which:

Fig. 1 shows in perspective a general assembly of parts of a device embodying a preferred form of the invention, with a projectile in position to be worked on.

Fig. 2 is a vertical section of some of the parts of the apparatus of Fig. 1, showing the operating mechanisms, a projectile, and a collector for the cuttings.

Fig. 3 is a plan view of a cutting tool and associated elements.

Fig. 4 is a plan view, partially in section, of a device for holding the work.

Fig. 5 is an elevation of the work holder of Fig. 4, showing a means for locking the work holder.

Fig. 6 is a vertical section of a portion of the locking means of Fig. 5.

Fig. 7 is a perspective of one of the elements of the locking means of Fig. 4.

Figure 1:
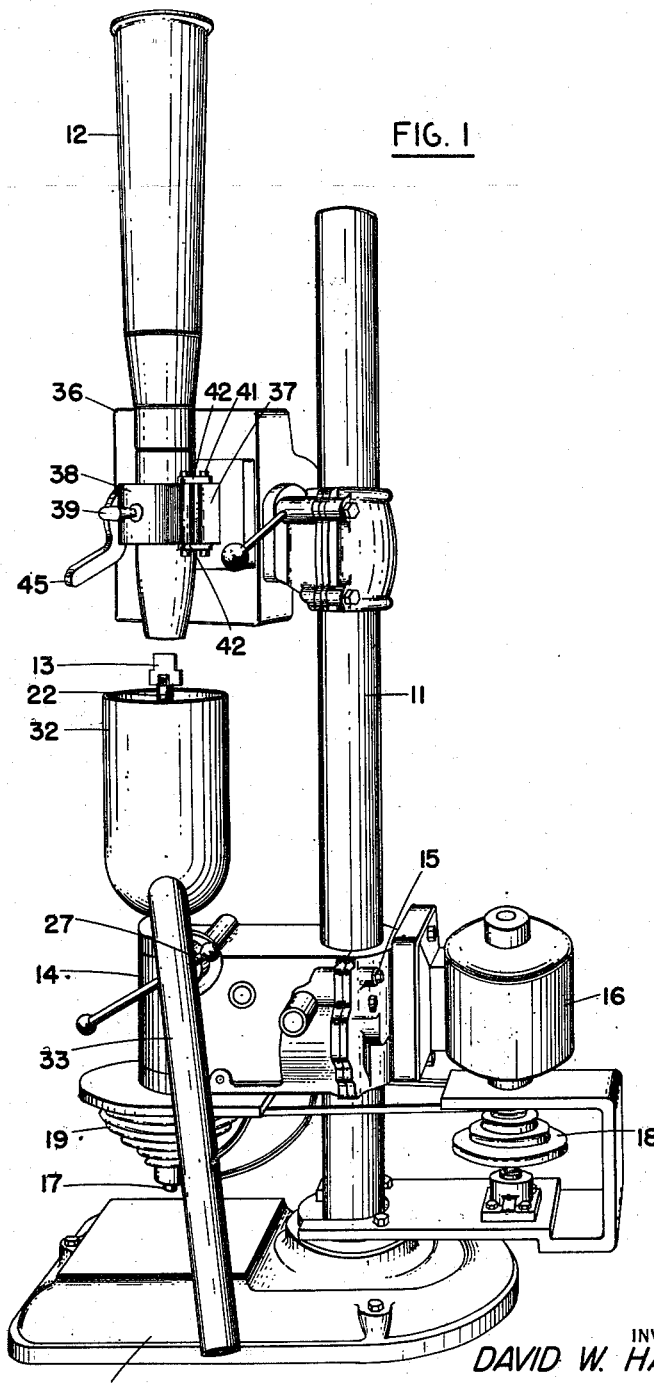

The invention contemplates a machine of the drill press type, which comprises a suitable base or pedestal 10, and a columnar support 11 that has means at its upper end for holding a projectile 12 and means at its lower end for supporting and vertically actuating a tool 13.

A tool head 14 is adjustably held on the support 11 by means of clamping bolts 15. A motor 16 or similar device is mounted on the tool head 14 and provides power to a power spindle 17 through a pair of co-operating cone pulleys 18 and 19. The upper end of the spindle 17 is appropriately socketed to receive the correspondingly shaped lower end of a shaft 21, of which the upper end 22 is externally threaded. A bit or cutter 13 having a suitable cutting edge 24 is fastened to the upper end of the shaft 21 by means of a screw 25. It is obvious that the motor 16 need not be located exactly where shown, and also that, if preferred, the controls therefor may be mounted at a remote point.

Surrounding the spindle 17 and pinned to it for vertical movement therewith but without partaking of its rotation is a sleeve 26, which is accomplished by the pin in sleeve 26 engaging in the circumferential groove in shaft 17, as shown in Fig. 2. A manual feed control 27 mounted in the tool head 14 is connected to the sleeve 26 to impart vertical movement thereto. Consequently, the member 26 will control the vertical travel of the shaft 21 and the cutting tool 13.

A circular work platform or rest 28 is internally threaded at 29 to mate with the upper portion 22 of the shaft 21 and to be adjustably fixed thereon. A plurality of guard rollers 30 are journaled over the upper face of the work rest 28 for the purpose of contacting the nose of the projectile 12 in the extreme upper limit of travel of the tool 13.

A hopper 32 to which is attached a chute 33 surrounds the upper portion of the shaft 21 and is secured to the sleeve 26 by means of an adjustable leg 31. The hopper 32 is open at its upper end to receive the cuttings and other debris, and the chute 33 is open at the bottom to discard them. To prevent cuttings from accumulating on the threaded portion 2 of the shaft 21, a hollow sleeve 34 is mounted within the hopper 32 and is fixed thereto. The shaft 21 extends through the sleeve 34. The upper portion of the sleeve 34 is reduced and is covered by a skirted bushing 35 that is threaded on and fixed to the portion 22 of the shaft 21. The bushing 35 is fitted against the underside of the work rest 28 to form a lock nut therefor. Consequently, as the spindle 17 rises it carries with it not only the cutting tool 13 but also the hopper 32, so that the cuttings will fall down through the chute 33 without interfering with the threads on the shaft 21 or with the other working parts of the apparatus.

The projectile 12 to be worked on is fixed in position by a work holder 36 suitably clamped to the support 11. The work holder 36 includes a fixed jaw 37 having a semi-cylindrical face, and a hinged jaw 38 having a complementary face, both the jaws 37 and 38 being of the proper size to firmly hold the work 12. A handle 39 is provided for the purpose of manipulating the movable jaw 38. The movable jaw 38 swings about a vertical pivot 41 and is attached to the said pivot by means of straps 42. Horizontally journaled in the fixed jaw 37 for free rotary movement therein is a pin 43 having a projecting eccentric head 44, and fixed on the eccentric head 44 is a cam lever 45. It will be seen, therefore, that the cam lever 45 is mounted for eccentric pivoting about the longitudinal axis of the pin 43. The cam lever 45 is provided with an inner cam face 46. A horizontal pin 47 is fixed in the hinged jaw 38, and the cam face 46 of the lever 45 will cooperate with the pin 47. The eccentric pin 43 is provided with an annular groove 48, and a retaining screw 49 is threaded in the fixed head 37 to engage in the annular groove 48 to hold the pin 43 against longitudinal displacement.

With the various parts of the apparatus assembled, the operation thereof will now be described. The movable jaw 38 is swung open by means of the handle 39, and a projectile 12 is centered in the fixed jaw 37. The hinged jaw 38 is now closed against said projectile and the cam lever 45 depressed. The cam face 46 on the cam lever 45 will co-act with the pin 47 to firmly hold the work 12. The work rest 28 having been suitably adjusted on the threaded portion 22 of the shaft 21 to provide a limit to the upward travel of the tool 13, the rotary feed 27 is turned to elevate the tool 13 to cut into the work 12 until the rollers 30 on the work rest 28 come into contact with the lower face of the work 12. The cuttings will fall into the hopper 32 and through the chute 33.

It will be understood that the present device is used to remove the solidified or compacted explosive composition, such as TNT, for example, from a region at the nose end of the projectile. In standard types of shells, a fuze is located at the forward end of the projectile and forms its tip or point. Such fuze must first be removed, leaving the shell with a relatively wide "mouth," into which the tool will enter to cut or scrape away the explosive charge for a set distance. This leaves a clear space at the front end of the shell, in which experimental devices may be placed, for example, fuzes having a relatively long rearward extension into the shell, such as a "proximity" fuze. There is also the possibility of collecting the chips or borings of explosive, to subject them to tests, if desired.

It will be obvious that various changes may be made in the size and arrangement of parts without departing from the spirit of the invention as expressed in the following claim.

I claim:

A cutting machine for removing explosives from a projectile comprising, a clamp having a cylindrically shaped face for holding a projectile, a rotating shaft mounted in axial alignment with the axis of said cylindrically shaped clamp, a cutting tool mounted on the end of said shaft nearest said clamp, means for axially moving said shaft and said cutting tool, a work stop mounted on said shaft a fixed distance from said cutting tool and rotating therewith for limiting the axial movement of said shaft and said cutting tool, said work stop having anti-frictions means for contacting the end of a projectile mounted in said clamp, a discharge hopper journalling said shaft and axially movable therewith for enclosing said cutting tool and said clamp during the cutting operation, a sleeve surrounding said shaft and supported by said hopper, and a cylindrical skirt suspended from said rotating work stop and overhanging said sleeve to prevent cuttings from entering said sleeve.

DAVID W. HAMLIN.

REFERENCES CITED

The following references are of record in the file of this patent:

UNITED STATES PATENTS

| Number | Name | Date |
|---|---|---|
| 257,374 | Otis | May 2, 1882 |
| 734,051 | Falkenau | July 21, 1903 |
| 1,238,362 | Thompson, Jr. | Aug. 28, 1917 |
| 2,077,109 | Jasmin | Apr. 13, 1937 |
| 2,081,487 | Lane | May 25, 1937 |
| 2,323,258 | Thompson | Jan. 29, 1943 |